(No Model.)

E. BAUSCH.
PRISM GAGE.

No. 587,637. Patented Aug. 3, 1897.

Witnesses:
Thomas Durant
Wallace Murdock

Inventor,
Edward Bausch
by Church & Church
his atty's.

United States Patent Office.

EDWARD BAUSCH, OF ROCHESTER, NEW YORK, ASSIGNOR TO THE BAUSCH & LOMB OPTICAL COMPANY, OF SAME PLACE.

PRISM-GAGE.

SPECIFICATION forming part of Letters Patent No. 587,637, dated August 3, 1897.

Application filed August 21, 1896. Serial No. 603,494. (No model.)

*To all whom it may concern:*

Be it known that I, EDWARD BAUSCH, of Rochester, in the county of Monroe and State of New York, have invented certain new and useful Improvements in Prism-Gages; and I do hereby declare the following to be a full, clear, and exact description of the same, reference being had to the accompanying drawings, forming a part of this specification, and to the reference-letters marked thereon.

My present invention has for its objects to provide a protractor or instrument particularly adapted for measuring the angles of prisms, such as are used in optical instruments, and as these prisms vary greatly in thickness at their thinner edges it is desirable to provide a comparatively small gage which may be used to rapidly and accurately measure prisms of different thickness; and to this end it consists in certain improvements, all as will be hereinafter described, and the novel features pointed out in the claims at the end of this specification.

Figure 1:
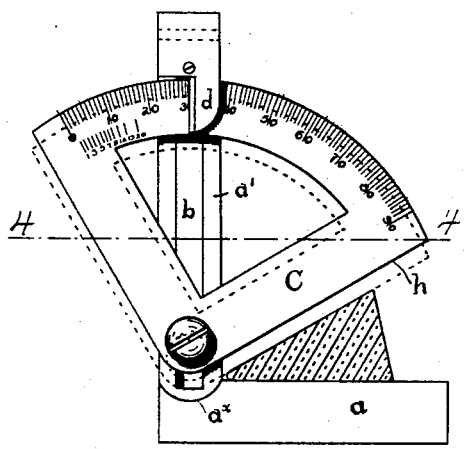
Figure 3:
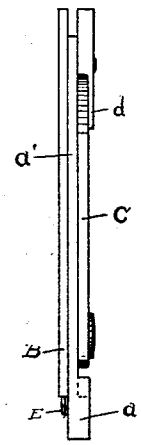
Figure 4:
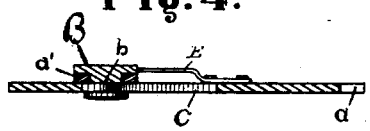
Figure 2:
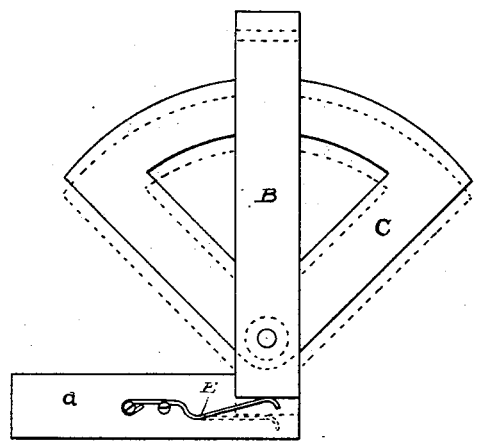

In the drawings, Figure 1 is an elevation of the gage, illustrating the manner of using it; Fig. 2, a rear view; Fig. 3, an edge view; Fig. 4, a section on the line 4 4 of Fig. 1.

Similar reference-letters in the several figures indicate similar parts.

The main frame of the instrument embodies two arms $a$ and $a'$, extending at right angles, the former constituting the base from which the angle of the prism is measured. The arm $a'$ is provided with a longitudinal slot, in which operates a rib $b$ on the front of a plate B, vertically movable on the rear of the arm $a'$.

C indicates a sector (in the present instance a quadrant) pivoted to the front of the lower portion of the plate B, having its outer curved edge divided into degrees or provided with other indicia adapted to coöperate with an index $d$, formed upon or attached to the plate B and extending over the edge of the sector and serving as a guide for its periphery.

The inner end of the arm $a$ is recessed at $a^\times$ to permit the lower edge of the sector near the pivot to be moved to the edge of the arm $a$, forming the base-line or straight edge, so that a sharp angle may be formed by them, and the plate B is moved upward, sliding in the arm $a'$, by means of a spring E, secured to the frame, the free end of which engages the lower end of said plate.

The operation will be understood by reference to Fig. 1, the prism to be measured being placed with one face upon the inner edge of the arm $a$. The sector is then revolved until the edge $h$ thereof falls upon the opposite face of the prism, when the plate B is pressed down until the entire edge $h$ bears upon or lies in the same plane as the face of the prism, and the index will then indicate upon the scale the angle of the faces. From this construction it will be readily seen that I am enabled to read equal angles in different thickness of glass without the necessity of increasing the size of the sector or the length of the arm $a$, as would be necessary if the center of rotation of the inclosing arms of the angle were stationary. Upon the outer edge and inside of the degree graduation of the segment is placed a dioptric scale, whereby the focal length of the prism may also be indicated by the index $d$, although this is immaterial to its successful operation.

While I prefer to employ a spring for moving the plate carrying the sector, it is obvious that said plate could otherwise be adjusted, but the present arrangement greatly facilitates the rapid measurement of different prisms, and although especially adapted for this use the instrument could be used for other purposes.

I claim as my invention—

1. The combination with the frame consisting of the straight edge and the rigid upright extending at an angle from one end thereof and forming a stop for the article measured, of the plate guided and movable upon the upright toward and from the straight edge, the arm pivoted at one end to the lower portion of the plate and extending over the straight edge in one direction only from the pivot, whereby the pivot of the plate is movable toward and from the straight edge, and indicia for indicating the relative angle of the arm and straight edge, substantially as described.

2. The combination with the frame having the straight edge, and the upright thereon, of the plate sliding on the upright, the arm pivoted on the sliding plate and extending over the straight edge from the pivot in one direction only, thereby enabling the pivot to be brought in close proximity to the straight edge, indicia for indicating the relative angle of the arm and straight edge, and the spring for moving the sliding plate away from the straight edge, substantially as described.

3. The combination with the frame having the arms $a$, $a'$, of the sliding plate B, the sector C pivoted to the lower end of the plate B having the indications thereon, an index cooperating therewith, and the spring for moving the plate on the frame and away from the arm $a$, substantially as described.

4. The combination with the frame having the arms $a$ and $a'$ and the recess $a^\times$, of the plate B sliding on the arm $a'$ having the index $d$, the sector C pivoted on the plate B having the indications thereon, and the spring E for moving the plate B, substantially as described.

EDWARD BAUSCH.

Witnesses:
RUDOLF ZIMMERMANN,
FRANK H. MASON.